Nov. 11, 1941.    R. H. SCOTT ET AL    2,262,207
ELECTRICALLY HEATED MELTING POT FOR TYPOGRAPHICAL CASTING MACHINES
Filed Dec. 14, 1939

INVENTORS
Richard H. Scott and
William Brown
By Mason Kennedy Campbell
Attorneys Patented Nov. 11, 1941

2,262,207

UNITED STATES PATENT OFFICE 2,262,207

ELECTRICALLY HEATED MELTING POT FOR TYPOGRAPHICAL CASTING MACHINES

Richard Henry Scott, Enfield, and William Brown, Altrincham, England, assignors to Linotype and Machinery Limited, London, England, a company of Great Britain Application December 14, 1939, Serial No. 309,167 In Great Britain December 23, 1938

14 Claims. (Cl. 219—20)

This invention relates to improvements in the construction of electrically heated metal pots for typographical casting machines. More particularly the invention relates to melting pots in which the metal is first melted by means of two or more elements, and, when the metal has been melted the number of heating elements in use is automatically reduced and the metal pot kept at a desired uniform temperature. Our copending application Serial No. 251,624, filed January 18, 1939, for "Electrically heated melting pots for typographical casting machines" is directed to related subject matter.

The object of the invention is to provide automatic devices which, in the event of a failure in the electrical circuit, are effective to indicate or to correct any such failure in the circuit.

Improved control circuits, according to the invention, comprise devices which, in the event of a breakdown in a main heating element, cause another heating element to be automatically switched into circuit, and also cause signalling devices to indicate such condition of the circuit to the operator.

The invention also contemplates the provision of means for indicating to the operator a breakdown in an auxiliary heating element. In a preferred form of the invention one of the heating elements has in series therewith the winding of a relay which, in the event of breakdown in the heating element allows switching devices to be closed which bring into use a heating element which is at that particular time inoperative. At the same time failure of the heating element breaks the circuit of a signal light which is alight when the circuit is in working condition.

Figure 1:
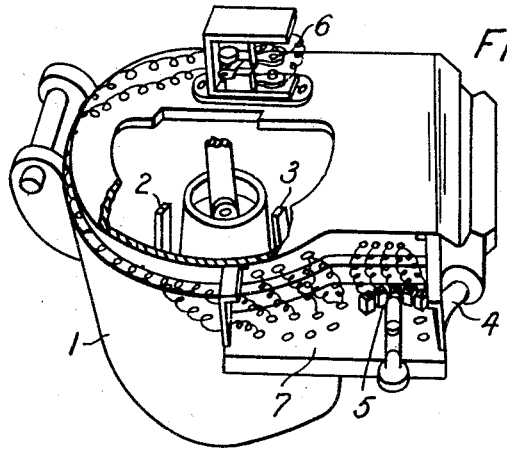
Figure 2:
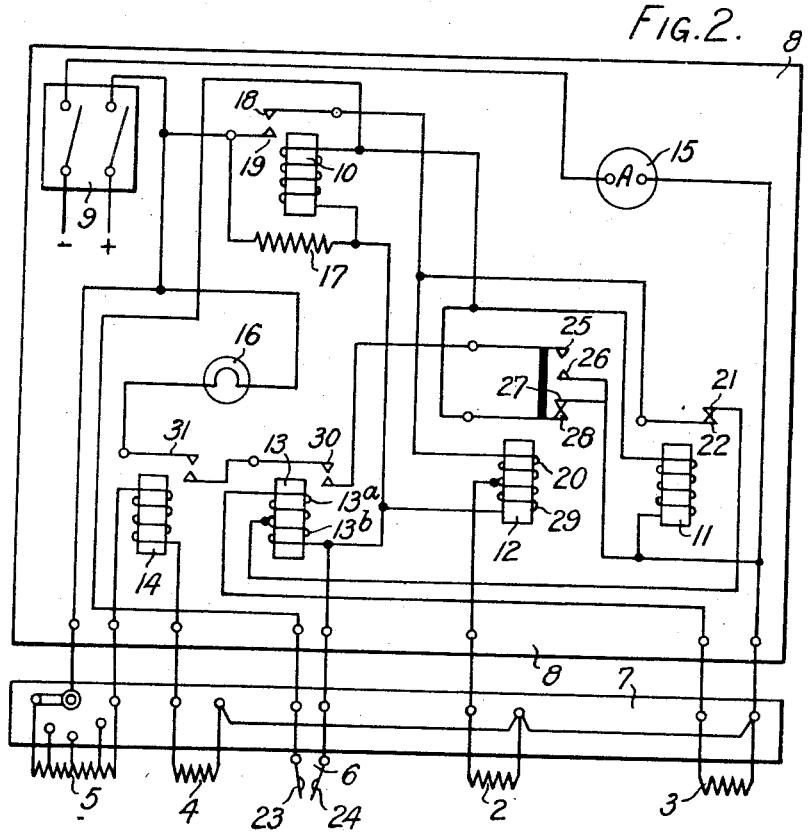

One constructional form of the invention is shown by way of example in the accompanying drawing in which:

Figure 1 is a view of the metal pot with a part broken away to show the heating elements, and the cover of the thermostat removed, and Figure 2 is a diagram showing the connections between the metal pot heating elements and the control devices therefor.

Referring to the drawing, the metal pot 1 is provided with two separate pot heating elements, 2, 3, an element 4 controlled by a rheostat 5, for heating the throat thereof and an electric thermostat 6 having normally open contacts, the connections from these devices being brought to a terminal board 7 on the exterior of the pot 1. The terminal board 7 is connected to terminals on a conveniently located regulator panel 8, to which is affixed the switch gear and control mechanism. This mechanism preferably consists of a double pole main switch 9, a number of electro-magnetic relays 10, 11, 12, 13, 14, an ammeter 15, and a signal light 16.

These devices are so connected that when the double pole switch 9 is closed, current passes through a resistance 17, through the coil winding on the master relay 10 and through the coil winding of the relay 11 in series with the coil winding of the master relay 10 and controlling the auxiliary element 3 (hereinafter termed the auxiliary relay). The resistance of these relay windings is such that the master relay 10 only is brought into operation when the main circuit is closed by the double pole switch 9, the auxiliary relay 11 at that stage being inoperative. The operation of the master relay 10 closes contacts 18, 19 so passing current through the coil winding 20 of another relay 12 (hereinafter termed the working relay) which controls the working element 2; also current is allowed to pass through normally closed contact points 21, 22, controlled by the auxiliary relay 11 through the winding 13a of the relay 13 to the auxiliary element 3, the relay 11 being then inoperative as stated above.

The condition just described is maintained during the melting of the metal in the pot. When the metal has melted and reached a predetermined temperature, switch points 23, 24 on the thermostat 6 are closed and the coil winding of the master relay 10 is thereby short circuited, thus causing the circuit through the coil winding 20 of the working relay 12 to be broken and the working element 2 to be rendered inactive. This shorting of the master relay 10 decreases the resistance in series with the auxiliary relay 11 which thereupon operates to break the contacts 21, 22 under its control, and to render the auxiliary element 3 inactive. Thus at this stage, with the metal in the pot at the predetermined working temperature, both heating elements 2, 3, are inactive.

Current can still pass through the resistance 17, through a winding 29 on the relay 12 and through the working element 2, but the resistance of this circuit is such that there is insufficient current passing to render the working element 2 active. Similarly, current can still pass through the resistance 17, through windings 13b and 13a of the relay 13 and through the auxiliary element 3, but the resistance of this circuit is such that there is insufficient current passing to render the auxiliary element 3 active.

When the contacts 23, 24 of the thermostat 6 again open as the temperature of the metal in the pot falls, the master relay 10 is again energised and current passes through the working relay 12 to render the working element 2 active; the auxiliary relay 11 under this condition, is strong enough to keep open the contact points 21, 22 under its control so that the auxiliary element 3 remains inactive. Control of the working element 2 by the thermostat 6 as just described, continues throughout normal operation of the heating system, after the melting period, it being understood that at the end of the melting period the auxiliary element 3 is automatically rendered inactive. If, however a breakdown of the working element 2 occurs, safety devices, according to the invention, cause the auxiliary element 3 to be again brought into circuit.

For this purpose, in the constructional form of heating circuit under review, the working relay 12 is arranged to control two sets of contact points 25, 26 and 27, 28 one of which (25, 26) is closed and the other (27, 28) open when the relay 12 is active, and vice versa, (as shown in Figure 2) when the relay 12 is inactive.

The working relay 12 is active during the normal operation of the heating system with the auxiliary element 3 inactive as the relay has a primary winding 20 and a secondary winding 29 either of which is in series with the working element 2, the primary winding 20 being in circuit when the master relay 10 is energized, and the secondary winding 29 being in circuit when the master relay 10 is short circuited by the thermostat 6.

In the event of a breakdown in the working element 2 the current through the relay 12 is broken, irrespective of the winding thereof in operation, and the position of the two sets of contact points 25, 26 and 27, 28 reversed. The closing of one set 27, 28 thus effected short circuits the winding on the auxiliary relay 11 which had been keeping open the contact points 21, 22 disconnecting the auxiliary element 3. The simultaneous opening of the other set of contacts 25, 26 interrupts a circuit through two switches 30, 31 and a signal light 16 which latter, when the heating system is in normal operation, remains alight. One of the just-mentioned switches 30 is controlled by the relay 13 in series with the auxiliary element 3 and the other of the said switches 31 is controlled by a relay 14 in series with the element 4 which heats the throat of the metal pot. Consequently, when the above-mentioned contact points 25, 26 in series with these switches 30, 31 are open, as in the case of a breakdown in the working element 2, or when either the switches 30, 31 are opened by the relays 13, 14 in the event of a breakdown of the auxiliary element 3 or the throat heating element 4, the circuit to the signal light 16 will be broken and the operator warned by the extinction of the light, of a breakdown in the circuit.

Having described our invention, we declare that what we claim and desire to secure by Letters Patent is:

1. An electrical heating device for the melting pot of a typographical casting machine, comprising a plurality of pot heating elements, switch gear operable to render active initially all said elements for melting metal in the pot, a thermostat having a single set of contacts operating at a predetermined temperature simultaneously to render inactive a plurality of pot heating elements and subsequently to render active and inactive a reduced number of said elements as the metal falls below or reaches said predetermined temperature, said devices acting upon an interruption in current flow through such reduced number of elements resulting from a breakdown therein, and independently of temperature conditions, to cause another heating element of said plurality to be automatically switched into circuit.

2. An electrical heating device for the melting pot of a typographical casting machine, comprising a working element and an auxiliary element, switch gear operable to render active initially both said elements for melting metal in the pot, a thermostat having a single set of contacts operating at a predetermined temperature simultaneously to render both said elements inactive and subsequently operating to render only the working element active and inactive as the metal falls below or reaches said predetermined temperature, and acting upon an interruption of current flow through the working element resulting from a breakdown therein, and independently of temperature conditions, to cause the auxiliary element to be automatically switched into circuit.

3. An electrical heating device for the melting pot of a typographical casting mechine, comprising a working element and an auxiliary element, switch gear operable to render active initially both said elements for melting metal in the pot, a thermostat operating at a predetermined temperature to render both said elements inactive and subsequently operating to render only the working element active and inactive as the metal falls below or reaches said predetermined temperature, a working relay having a coil winding in series with said working element, and contacts controlled by said working relay adapted in the event of a breakdown in the working element to switch the auxiliary element into circuit.

4. An electrical heating device for the melting pot of a typographical casting machine, comprising a working element and an auxiliary element, switch gear operable to render active initially both said elements for melting metal in the pot, a thermostat operating at a predetermined temperature to render both said elements inactive and subsequently operating to render only the working element active and inactive as the metal falls below or reaches said predetermined temperature, a working relay having a coil winding thereon in circuit when the working element is active and another winding thereon in circuit when the working element is inactive, and contacts controlled by said working relay adapted in the event of a breakdown in the working element to switch the auxiliary element into circuit.

5. An electrical heating device for the melting pot of a typographical casting machine, comprising a working element and an auxiliary element, switch gear operable to render active initially both said elements for melting metal in the pot, a thermostat operating at a predetermined temperature to render both said elements inactive and subsequently operating to render only the working element active and inactive as the metal falls below or reaches said predetermined temperature, an auxiliary relay controlling contacts adapted to switch the auxiliary element into and out of circuit, a working relay having a coil winding in series with said working element, and contacts controlled by the working relay adapted to short circuit the coil winding of the auxiliary relay so as to close the contacts controlled by said auxiliary relay and switch the auxiliary element into circuit in the event of a breakdown in the working element.

6. An electrical heating device for the melting pot of a typographical casting machine, comprising a working element and an auxiliary element, switch gear operable to render active initially both said elements for melting metal in the pot, a thermostat operating at a predetermined temperature to render both said elements inactive and subsequently operating to render only the working element active and inactive as the metal falls below or reaches said predetermined temperature, an auxiliary relay controlling contacts adapted to switch the auxiliary element into and out of circuit, a working relay having a coil winding thereon in circuit when the working element is active and another winding thereon in circuit when the working element is inactive, and contacts controlled by the working relay adapted to short circuit the coil winding of the auxiliary relay so as to close the contacts controlled by said auxiliary relay and switch the auxiliary element into circuit in the event of a breakdown in the working element.

7. An electrical heating device for the melting pot of a typographical casting machine, comprising a working element and an auxiliary element, switch gear operable to render active initially both said elements for melting metal in the pot, a thermostat operating at a predetermined temperature to render both said elements inactive and subsequently operating to render only the working element active and inactive as the metal falls below or reaches said predetermined temperature, a signal light adapted to indicate a normal condition of the circuit, and devices acting upon the interruption in current flow through the working element when a breakdown therein occurs, to cause simultaneously the automatic switching into circuit of the auxiliary element and the changing of the signal light indication.

8. An electrical heating device for the melting pot of a typographical casting machine, comprising a working element and an auxiliary element, switch gear operable to render active initially both said elements for melting metal in the pot, a thermostat operating at a predetermined temperature to render both said elements inactive and subsequently operating to render only the working element active and inactive as the metal falls below or reaches said predetermined temperature, a signal light active during all normal conditions of the circuit, acting upon the interruption in current flow through the working element when a breakdown occurs therein simultaneously to switch in the auxiliary element and to switch out the light.

9. An electrical heating device for the melting pot of a typographical casting machine comprising a working element, and an auxiliary element, switch gear operable to render active initially both said elements for melting metal in the pot, a thermostat operating at a predetermined temperature to render both said elements inactive and subsequently operating to render only the working element active and inactive as the metal falls below or reaches said predetermined temperature, a signal light active during all normal conditions of the circuit, a working relay having a coil winding in series with the working element, a set of contacts controlled by said working relay adapted to switch the auxiliary element into circuit in the event of a breakdown in the working element, and a second set of contacts controlled by said working relay adapted in the event of a breakdown in the working element to switch out the signal light.

10. An electrical heating device for the melting pot of a typographical casting machine comprising a working element, and an auxiliary element, switch gear operable to render active initially both said elements for melting metal in the pot, a thermostat operating at a predetermined temperature to render both said elements inactive and subsequently operating to render only the working element active and inactive as the metal falls below or reaches said predetermined temperature, a signal light active during all normal conditions of the circuit, a working relay having a coil winding thereon in circuit when the working element is active and another coil winding in circuit when the working element is inactive, a set of contacts controlled by said working relay adapted to switch the auxiliary element into circuit in the event of a breakdown in the working element, and a second set of contacts controlled by said working relay adapted in the event of a breakdown in the working element to switch out the signal light.

11. An electrical heating device for the melting pot of a typographical casting machine comprising a working element, and an auxiliary element, switch gear operable to render active initially both said elements for melting metal in the pot, a thermostat operating at a predetermined temperature to render both said elements inactive and subsequently operating to render only the working element active and inactive as the metal falls below or reaches said predetermined temperature, a signal light active during all normal conditions of the circuit, a working relay having a coil winding in series with the working element, an auxiliary relay controlling contacts for rendering the auxiliary element active, a working relay having a coil winding thereon in series with the working element, a set of contacts controlled by the working relay adapted to short circuit the coil winding of said auxiliary relay to switch the auxiliary element into circuit, and a second set of contacts controlled by said working relay adapted in the event of a breakdown in the working element to switch out the light.

12. An electrical heating device for the melting pot of a typographical casting machine comprising a working element, and an auxiliary element, switch gear operable to render active initially both said elements for melting metal in the pot, a thermostat operating at a predetermined temperature to render both said elements inactive and subsequently operating to render only the working element active and inactive as the metal falls below or reaches said predetermined temperature, a signal light active during all normal conditions of the circuit, a working relay having a coil winding thereon in circuit when the working element is active and another coil winding in circuit when the working element is inactive, an auxiliary relay controlling contacts for rendering the auxiliary element active, a working relay having a coil winding thereon in series with the working element, a set of contacts controlled by the working relay adapted to short circuit the coil winding of said auxiliary relay to switch the auxiliary element into circuit and a second set of contacts controlled by said working relay adapted in the event of a breakdown in the working element to switch out the light.

13. An electrical heating device for the melting pot of a typographical casting machine, comprising a plurality of pot heating elements, switch gear operable to render active initially all said elements for melting metal in the pot, a thermostat operating at a predetermined temperature to render inactive a plurality of pot heating elements and subsequently to render active and inactive a reduced number of said elements as the metal falls below or reaches said predetermined temperature, and a single normally operative indicating device connected in a circuit portion energized independently of the heating elements but controlled by the current flow therein and arranged to be rendered inoperative upon the interruption of current flow in any one of said heating elements due to a breakdown therein so as thereby to indicate such circuit breakdown.

14. An electrical heating device for the melting pot of a typographical casting machine, comprising a working element, an auxiliary element, and a throat element, switch gear operable to render active initially all said elements for melting metal in the pot and heating the throat, a thermostat operating at a predetermined temperature to render the working and auxiliary elements inactive and subsequently operating to render only the working element active and inactive as the metal falls below or reaches said predetermined temperature, and a single normally operative indicating device connected in a circuit portion energized independently of the heating elements but controlled by the current flow therein and arranged to be rendered inoperative upon the interruption of current flow in any one of said working, auxiliary and throat elements due to a breakdown therein so as thereby to indicate such circuit breakdown.

RICHARD HENRY SCOTT.
WILLIAM BROWN.